United States Patent
Imielinski (10) Patent No.: US 7,685,130 B2
(45) Date of Patent: Mar. 23, 2010

(54) SEARCHING FOR SERVICES IN NATURAL LANGUAGE

(75) Inventor: Tomasz Imielinski, Princeton, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 1086 days.

(21) Appl. No.: 11/347,192

(22) Filed: Feb. 2, 2006

(65) Prior Publication Data
US 2007/0192292 A1    Aug. 16, 2007

(51) Int. Cl.
*G06F 17/30* (2006.01)

(52) U.S. Cl. .............. 707/10; 707/104.1; 704/257
(58) Field of Classification Search ............ 707/2–5, 707/10, 101, 102, 104.1, 257, 270, E15.017, 707/E15.018; 704/257, 270, E15.017, E15.018
See application file for complete search history.

(56) References Cited

U.S. PATENT DOCUMENTS

| | | | | |
|---|---|---|---|---|
| 6,151,624 | A * | 11/2000 | Teare et al. | 709/217 |
| 2004/0193420 | A1 * | 9/2004 | Kennewick et al. | 704/257 |
| 2007/0022109 | A1 * | 1/2007 | Imielinski et al. | 707/4 |
| 2007/0038436 | A1 * | 2/2007 | Cristo et al. | 704/9 |
| 2008/0005651 | A1 * | 1/2008 | Grefenstette et al. | 715/500 |

* cited by examiner

*Primary Examiner*—Leslie Wong
(74) *Attorney, Agent, or Firm*—Stephen M. De Klerk; Sonnenschein, Nath & Rosenthal LLP (57) ABSTRACT

A method for answering search queries about services is disclosed. The method includes searching a plurality of storage media on a network for a natural language service metastatement. The natural language service metastatement is typically generated by a service provider and describes the services provided by the service provider in detail. The method also includes locating the natural language service metastatement in the storage media and extracting the natural language metastatement from the storage media. The method also includes indexing the natural language metastatement in a service description index. Thus, when a search query for a service is received, the service description index is searched for a natural language service metastatement corresponding to the search query, and the search result is provided in the form of a natural language answer.

7 Claims, 8 Drawing Sheets

SEARCHING FOR SERVICES IN NATURAL LANGUAGE

FIELD OF THE INVENTION

This invention relates to the field of searches for services and, in particular, to systems and methods for searching for services in natural language.

BACKGROUND OF THE INVENTION

The Internet is a global network of computer systems and websites. These computer systems include a variety of documents, files, databases, and the like, which include information covering a variety of topics. It can be difficult for users of the Internet to locate this information on the Internet.

Search engines are used by most people to locate this information on the Internet. The websites and computer systems have mechanisms for describing the content of their websites and computer systems, which are used by these search engines to help users to locate the information on the Internet. Well known mechanisms for describing content of sources and web services, such as Web Services Description Language (WSDL; http://www.w3.org/TR/2001/Note-wsdl-20010315), DARPA Agent Markup Language (DAML; http://www.daml.org), Ontology Web Language—Services (OWL-S; http://www.w3.org/TR/2004/REC-owl-features-20040210/#s 1.2), Language for Advertisement and Request for Knowledge Sharing (LARKS), and ontology builders, such as description logics, Database Query Language (DQL) and Resource Description Framework (RDF), are very complex and their documentation (W3C) runs into hundreds of pages. Querying these formal descriptions requires sophisticated extensions to Structured Query Language (SQL) (like Requirements Query Language (RQL)). However, these formalisms limit the searchability of the descriptions by search engines.

Users typically enter key words into the search forms of the search engine. The search engine then executes the search and provides a result of the search. For the most part, the result of the search is a list of hyperlinks to various websites having the desired information. A summary of information may also be provided on a results page. However, the results page often includes irrelevant results. In particular, if a user is looking for detailed information in a particular area, they may have a difficult time framing their search to find results that match their search criteria.

SUMMARY OF THE INVENTION

The invention provides a method for answering search queries about services, which includes generating natural language service metastatements for a provider of services; and publishing the natural language service metastatements.

The natural language service metastatements may be published by storing the natural language service metastatements such that a crawler associated with a search engine can locate the natural language service metastatements.

Natural language service metastatements may be generated by providing at least one target question to the provider of services; and automatically rephrasing the at least one target question into a statement using the answers of the provider of services.

The provider of services may provide a plurality of synonyms in response to the at least one target question. The natural language service metastatement may include a plurality of statements. At least one of the plurality of statements may include an epistemic predicate.

The invention also provides a method for answering search queries about services, which includes extracting a natural language service metastatement description for a provider of services; and indexing the natural language service metastatement in an index.

The index may be a service index. The service index may include the locations of the natural language service metastatements descriptions for the provider of services in a database associated with the service index. The service index may include the locations of the natural language service metastatements descriptions for the provider of services on the web. A crawler associated with a search engine may extract the natural language service metastatements description.

The invention further provides a method for answering search queries about services, which includes receiving a search query for a service; searching a service description index for a natural language service metastatement corresponding to the search query; and providing a search result to the search query using the natural language service metastatement corresponding to the search query.

The method may include identifying the search query as a query for a service.

The search query may be identified as a query for a service by tagging the search query for a service in the form of a natural language question as a search query for a service.

The search query may be identified as a query for a service by allowing a user to identify that the search query is for a service in the form of a natural language question.

The method may also include allowing the user to identify that the search query is for a service in the form of a natural language question by allowing the user to select an identifier for a search query for a service.

The method may also include converting the search query into a natural language service search statement.

The search query may be in the form of a natural language question.

The search result may be in the form of a natural language answer.

The invention further provides a method for answering search queries about services, which includes searching a plurality of storage media on a network for a natural language service metastatement, the natural language service metastatement being generated by a service provider and describing the services provided by the service provider in detail; locating the natural language service metastatement in one of the storage media; extracting the natural language metastatement from one of the storage media; indexing the natural language metastatement in a service description index; receiving a search query for a service; converting the search query for a service into a natural language service search statement; searching the service description index for a natural language service metastatement corresponding to the natural language service search statement; and providing a search result in the form of a natural language answer to the search query using the natural language service metastatement corresponding to the natural language service search statement.

BRIEF DESCRIPTION OF THE DRAWINGS

The invention is described by way of example with reference to the accompanying drawings, wherein.

DETAILED DESCRIPTION

Figure 1:
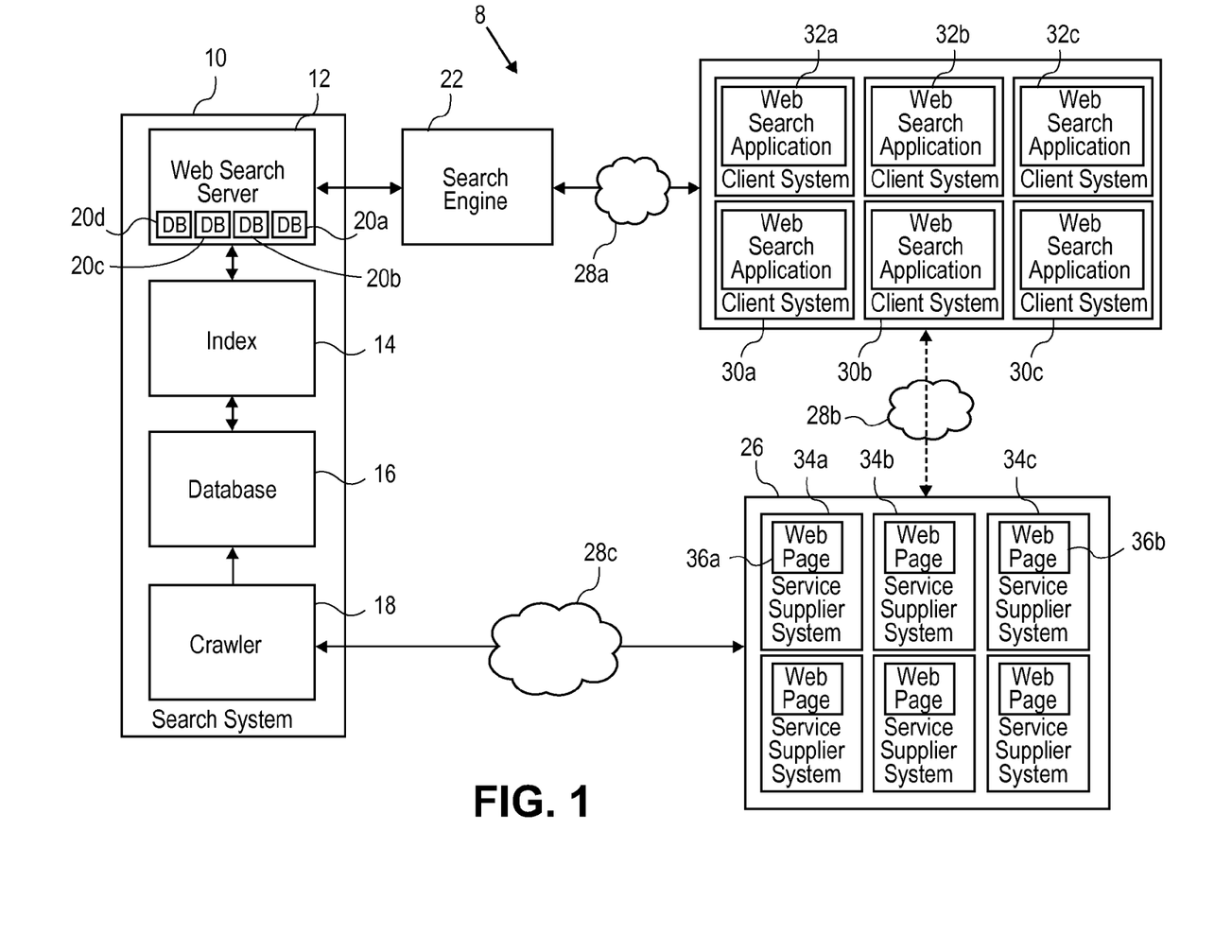
FIG. 1 is a block diagram illustrating a system for natural language service searching in accordance with one embodiment of the invention.

FIG. 1, of the accompanying drawings, illustrates a network system 8 which is used to improve search results for services. The network system 8 includes a search system 10. The search system 10 includes a web search server 12, an indexer 14, a database 16, and a crawler 18. The web search server 12 includes first, second, third and fourth databases 20a-20d. The network system 8 also includes a search engine 22, a plurality of client systems 24, a plurality of service supplier systems 26 and a network 28. The network 28 is illustrated as a first, second and third network 28a, 28b and 28c; however, it is envisioned that each of the networks 28a-28c may be the same network. The plurality of client systems 24 includes client systems 30a-30e. Each of the client systems 30a-30e includes a web search application 32a-32e, respectively. The plurality of service supplier systems 26 includes service supplier systems 34a-34e. Each of the service supplier systems 34a-34e includes a web page 36a-36e, respectively.

Although six client systems 30a-30e, web search applications 32a-32e, service supplier systems 34a-34e and web pages 36a-36e are shown, it will be appreciated that any number of client systems 30a-30e, web search applications 32a-32e, service supplier systems 34a-34e and web pages 36a-36e may be used, including a fewer number or greater number.

The web search server 12 and indexer 14 are in communication with one another. The indexer 14 and database 16 are also in communication with one another. The crawler 18 capable of communicating with the database 16.

The search engine 22 is in communication with the web search server 12 in search system 10. The search engine 22 is also in communication with the plurality of client systems 24. The plurality of client systems 24 are in communication with search engine 22 over the network 28a.

The plurality of service supplier systems 26 are in communication with the crawler 18 of search system 10 over the network 28c. The plurality of client systems 24 are capable of communicating with the plurality of service supplier systems 26 over the network 28b.

The web search server 12 is typically a computer system, and may be an HTTP server. It is envisioned that the search engine 22 may be located at the web search server 12.

The indexer 14 is typically a software program which is used to create an index, which is then stored in memory. The index is typically a table of alphanumeric terms with a corresponding list of the documents corresponding to the alphanumeric terms or the location of documents corresponding to the alphanumeric terms (e.g., a pointer). The pointer may be a URL. The indexer 14 may build a hash table, in which a numerical value is attached to the terms. The database 16 is stored in a storage media, which typically includes the documents which are indexed by indexer 14. The index may be included in the same storage media as the database 16 or in a different storage media. The storage media may be volatile or non-volatile memory that includes, for example, read only memory (ROM), random access memory (RAM), magnetic disk storage media, optical storage media, flash memory devices and zip drives.

The crawler 18 is a software program or software robot, which is typically used to build lists of the information found on Web sites. Another common term for the crawler 18 is a spider. The crawler 18 typically keeps track of the information located in its search and where the information is found.

The databases 20a-d are stored in storage media, and typically include more specific information than database 16. Thus, databases 20a-d may be directed to information directed to products for sale, services offered by companies, news information, photos, maps, local information and the like. Although four databases 20a-e are illustrated, any number of databases may be used, including a lesser or greater number. The databases 20a-d may also have an index associated therewith, which may be similar to the index discussed above. However, the index associated with the databases 20a-d would be limited to the information located in each of the databases 20a-d. Thus, if one of the databases is directed to services offered by companies, then the index associated with the database would be limited to the service information located in that database.

The network 28 is a local area network (LAN), wide area network (WAN), a telephone network, such as the Public Switched Telephone Network (PSTN), an intranet, the Internet, or combinations thereof.

The client systems 30a-30e and service supplier systems 34a-34e are mainframes, minicomputers, personal computers, laptops, personal digital assistants (PDA), cell phones, and the like. The client systems 30a-30e and service supplier systems 34a-34e are characterized in that they are capable of being connected to the network 28.

Figure 2:
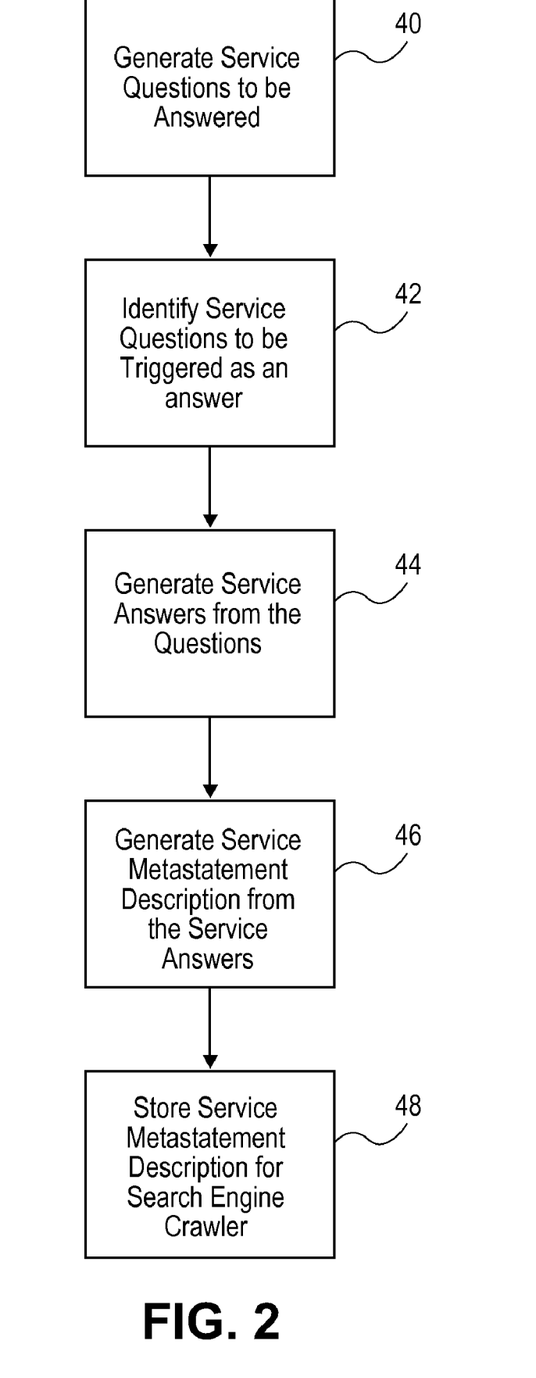
FIG. 2 is a process flow diagram showing a method for generating service metastatement descriptions to be searched in accordance with one embodiment of the invention.

FIG. 2 illustrates a method for generating service descriptions which will be used by the plurality of service supplier systems 26 illustrated in FIG. 1. The method begins by generating service questions to be answered at block 40. This is followed by identifying service questions to be triggered as an answer at block 42. At block 44, service answers are generated from the questions, which are combined to form a service metastatement description. The service metastatement descriptions are then stored at block 48 so that the search engine crawler 18 can locate the service metastatement descriptions.

The above method is typically performed by the plurality of service supplier systems 26. The method allows service providers to identify their services by identifying questions to which the service provider is the answer. The questions are converted into a service metastatement description, which is a declarative description of the services. The service meta statement description is typically generated by either the search system or by the plurality of service supplier systems 26.

The questions may be converted into the service metastatement description using software, which automatically converts the questions into a statement. Alternatively, the service provider may simply convert the questions into the statement or write the statement without first identifying questions. However, it is advantageous to have the service providers identify questions to which it is answer and convert the questions automatically because the resulting metastatement description will have the correct format to be searched. The conversion may occur at the remote site. Alternatively, the search engine may provide the tools to convert the questions into the metastatement description.

As discussed above, the descriptions are generated by first specifying a set of target questions for which the given service is the answer to. The service provider, who typically creates the description can write questions which the service provider wants to rephrase; that is, the search provider determines the search queries that the service provider wants to have matched against the metastatement description corresponding to the services offered by the service provider.

The service descriptions are natural language descriptions of the services provided by the service suppliers. Descriptions provided by search engines and databases will typically include statements beginning with the predicate "I know," which can be queried using natural language questions. For example, if a search query is received for "Who knows about when patents were granted," then the answer to the search query is "The U.S.P.T.O. knows." If the question is instead "What does ask.com know about cities," then the answer is "Ask.com knows the populations, capitals, crime rates, etc."

Similarly, descriptions provided by businesses selling a product will typically include statements beginning with the predicate "I sell," which can be queried using natural language questions, as described above. The service providers can also specify, in addition to the products that they sell, the prices that they sell the products for and where they sell those products. Similarly, the service providers can specify related services they offer, other than selling products. Thus, the service providers are able to advertise all of the services they offer, can also optionally advertise details about those services, such as, for example, the price, location, etc.

An exemplary set of questions and corresponding service metastatement description will now be described. If the service provider is a Ford car dealership, exemplary questions include: Who sells a Taurus? Who sells Explorers? Who leases a Taurus? Who sells cars? Who leases cars? What services does the Ford car dealership provide? The answers to the above questions are: Ford car dealership sells a Taurus; Ford car dealership sells Explorers; Ford car dealership leases a Taurus; Ford car dealership sells cars; Ford car dealership leases cars; Ford car dealership provides selling, leasing and servicing of vehicles. The service metastatement description for the Ford car dealership is, "Ford car dealership sells a Taurus. Ford car dealership sells Explorers. Ford car dealership leases a Taurus. Ford car dealership sells cars. Ford car dealership leases cars. Ford car dealership provides selling, leasing and servicing of vehicles."

Another exemplary set of questions and corresponding service metastatement description will now be described. If the service provider is ASK.COM, a search engine website, exemplary questions include: What questions does ASK.COM answer? What does ASK.COM know? Exemplary answers to the above questions are: ASK.COM answers questions about populations of countries; ASK.COM knows about calories of foods; ASK.COM answers questions about calories of a banana. A service metastatement description corresponding to the above answers is, "ASK.COM answers questions about populations of countries. ASK.COM knows about calories of foods. ASK.COM answers questions about calories of a banana."

Figure 2A:
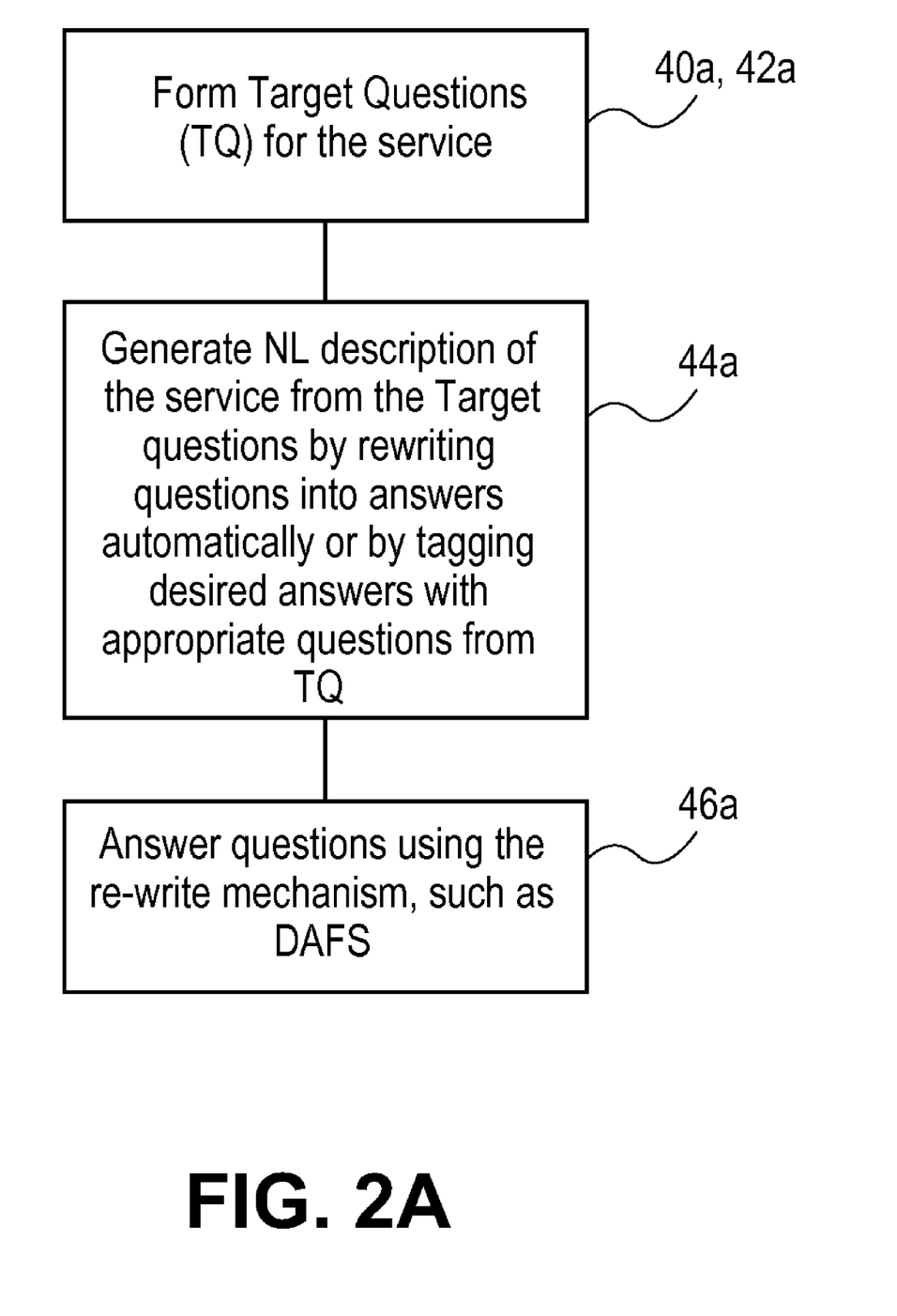
FIG. 2A is a process flow diagram showing a detailed method for generating service metastatement descriptions to be searched in accordance with one embodiment of the invention.

FIG. 2A illustrates a more detailed method for creating a service metastatement description. At block 40a, 42a, target questions (TQ) are formed for the service. At block 44a, the natural language service metastatement description is generated from the target questions (TQ) by rewriting the questions into answers automatically or by tagging desired answers with appropriate questions from TQ. At block 46a, the target questions are answered using a re-write mechanism, such as, for example, Direct Answers From Search (DAFS). DAFS is an algorithm which is used to reformulate search queries received as natural language questions into statements which can be exactly matched, but which can be used to generate the service metastatement description.

Figure 3:
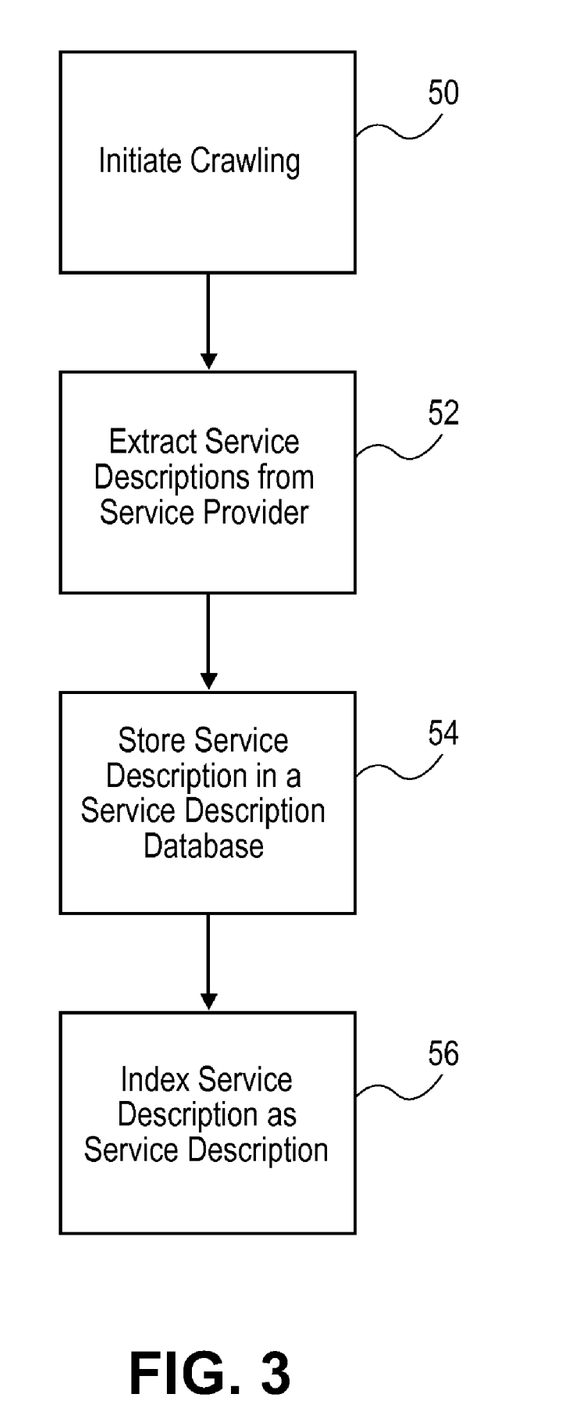
FIG. 3 is a process flow diagram showing a method for locating and indexing the service metastatements descriptions to be searched in accordance with one embodiment of the invention.

FIG. 3 illustrates a method for identifying the service descriptions and storing them with the search system 10 of FIG. 1. The search system 10 initiates crawling at block 50. This is followed by extracting service descriptions from the service providers at block 52. The service descriptions are then stored at the service description database at block 54 and these service description databases are indexed at block 56 as a service description.

The crawler 18 is used to crawl the plurality of service supplier systems 26 to locate the service metastatement descriptions. The crawler 18 employs software robots to build lists of the service metastatement descriptions. The crawler 18 may include one or more crawlers to search the plurality of service supplier systems 26. The crawler 18 extracts the service metastatement descriptions and stores them in the database 16. The indexer 14 creates an index of service metastatement descriptions stored in the database 16. Alternatively, if a database 16 is not used, the indexer 14 creates an index of service metastatement descriptions and where the descriptions are located in the Internet (typically a URL). The index created by the indexer 14 may be stored with a database (one of databases 20a-20e), which only includes the service metastatement descriptions located by the crawler 18.

Figure 4:
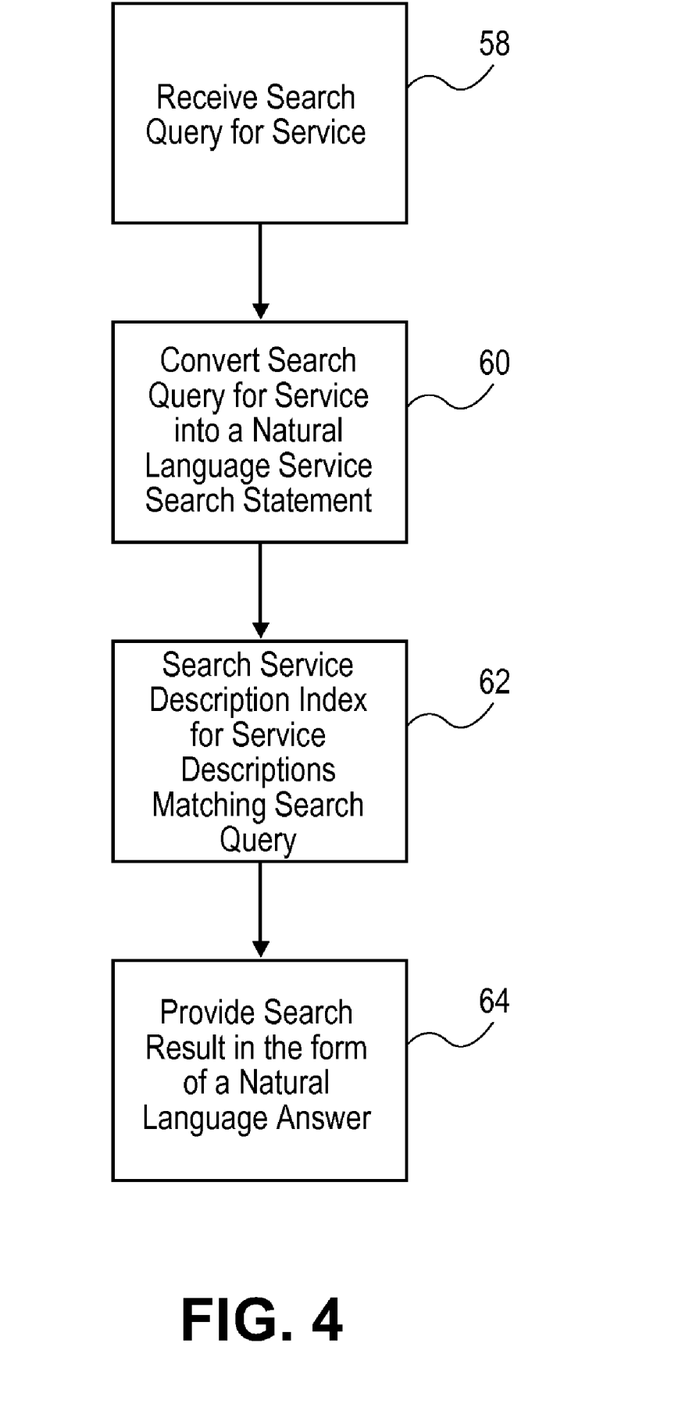
FIG. 4 is a process flow diagram showing a method for receiving a search query for a service and providing a result to the search query in accordance with one embodiment of the invention.

FIG. 4 illustrates a method for providing search results to search queries directed to services. The process begins by receiving a search query for a service at block 58. This is followed by converting the search queries for a service into a natural language service search statement at block 60. The service description index is then searched for service descriptions matching the search query at block 62. Finally, the search engine provides a search result at block 64. In one embodiment, the search result is in the form of a natural language answer. However, the search result may not be in the form of a natural language answer. For example, the search result may be a hyperlink linking the submitter of the search query to the service provider's website. The search result may be similar to conventional search results provided in response to search queries (similar to search results provided by Ask.com, Google.com or other searching systems).

Figure 4A:
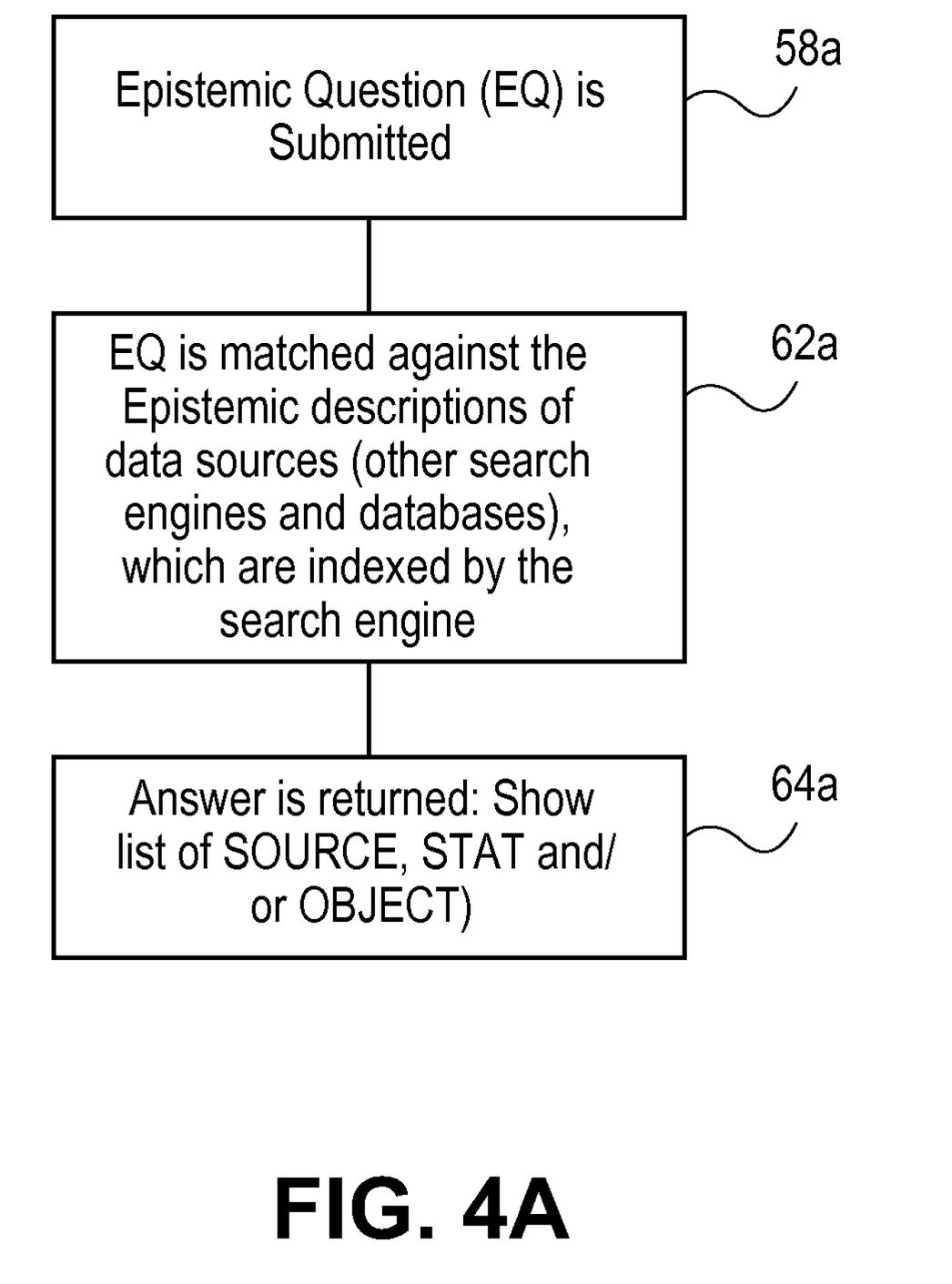
FIG. 4A is a process flow diagram showing a detailed method for receiving a search query for a service and providing a result to the search query in accordance with one embodiment of the invention.

FIG. 4A illustrates a more detailed method for performing the above method. At block 58a, an epistemic question (EQ) is submitted, typically by the client. At block 62a, the EQ is matched against the epistemic descriptions of date sources (i.e., service metastatement descriptions), which have been previously indexed by the search engine. The data sources may include other search engines and databases. At block 64a, an answer to the EQ is returned.

Figure 5:
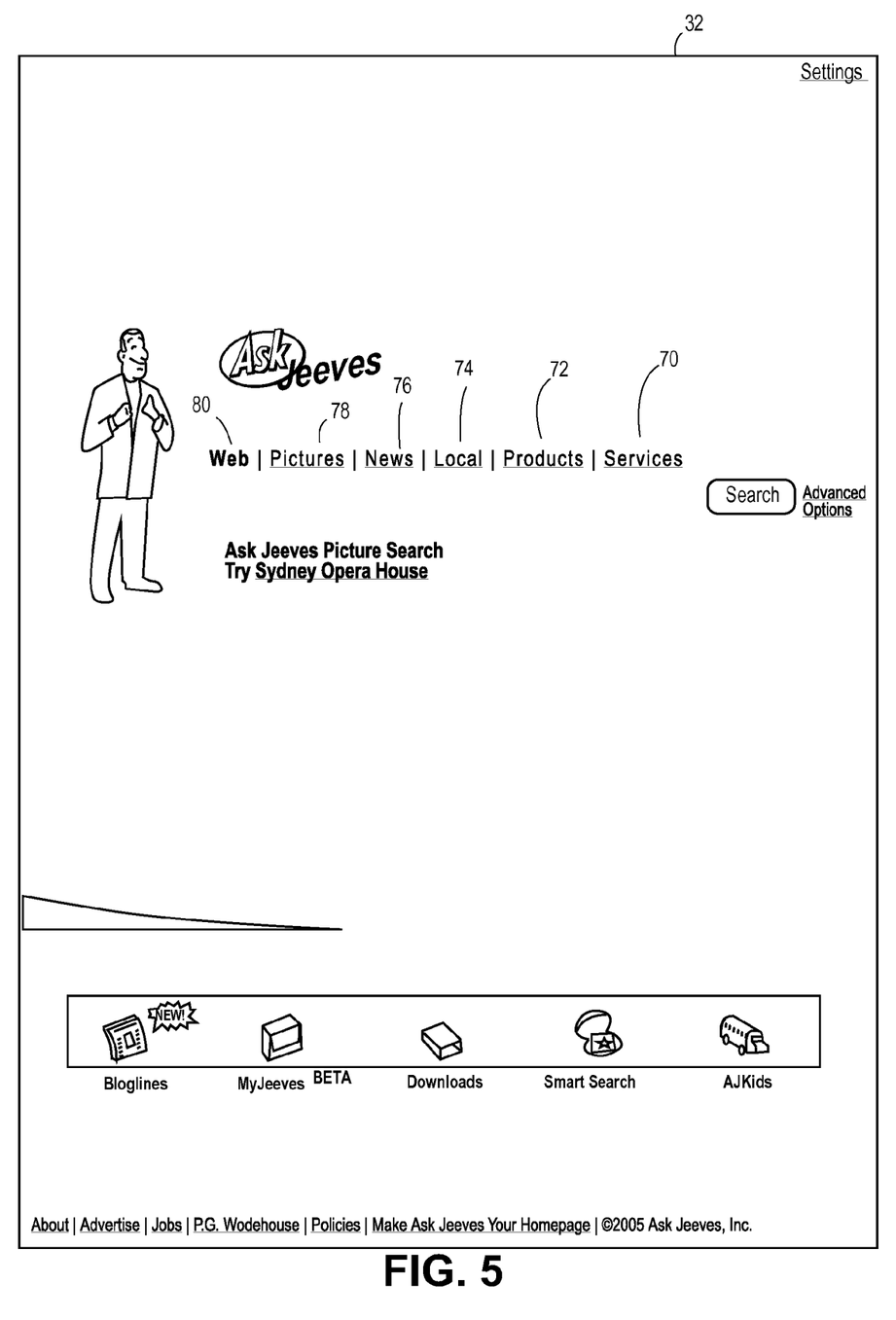
FIG. 5 is a screen shot of a web service application for a search system showing a link to identify a query for services.

FIG. 5 shows an exemplary screen shot of a search engine web application 32 which can be used to perform the above methods in accordance with one embodiment of the invention. The web application 32 includes links 70-80, which are used to identify that the search query is for services, products, local information, news, pictures and the web, respectively.

In order to identify that a service search query has been received, the search system 10 may provide a tab or a link on the web search application 32a-32e so that users (or clients) of the search engine can identify the query as a query for service providers.

Alternatively, question tagging can be used to identify that the search query for service providers has been requested. Question tagging is described in U.S. Provisional Patent Application Ser. No. 60/702,524 filed on Jul. 25, 2005 (client code 006560.P040Z), which is hereby incorporated by reference. Question tagging uses a meta-table and a question answering algorithm that uses the meta-table to classify and better answer queries.

Question tagging can also be used to perform the search. If question tagging is used to perform the search, the search query does not need to be converted from a search query into a search statement.

DAFS may also be used to convert the search query into a search statement. DAFS rewrites questions into answer templates and matches the answer template directly within documents without the user having to learn any query language, nor forcing the user to fill in laborious forms.

Figure 6:
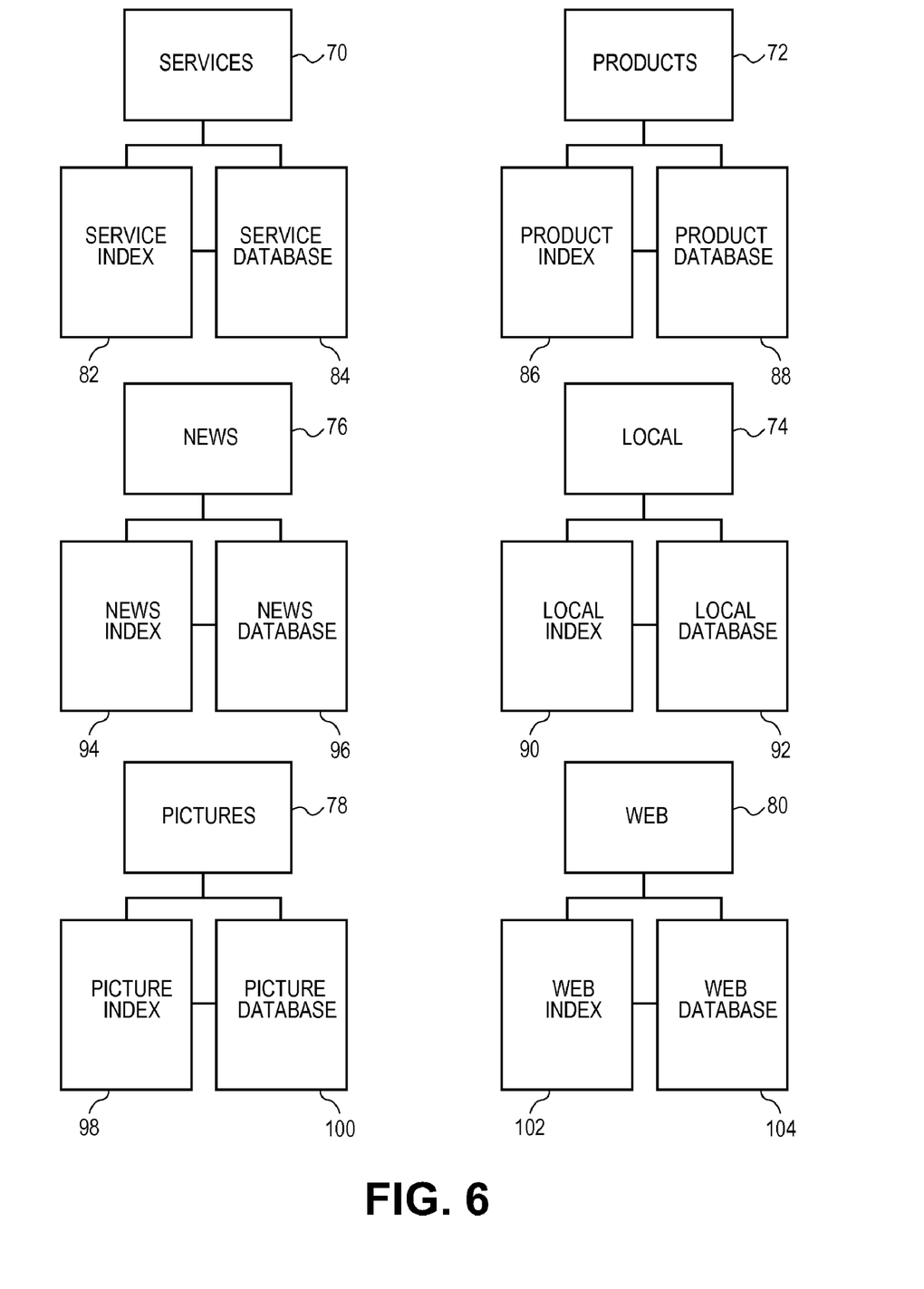
FIG. 6 is a block diagram showing links to identify a search query, each of the links associated with a corresponding index and database.

FIG. 6 illustrates the databases and indexes associated with each of the tabs or links 70 located on the web search application 32 (as described herein with reference to FIG. 5). The services link 70 is associated with a service index 82 and a corresponding service database 84. The products link 82 is associated with a product index 86 and a corresponding product database 88. The local link 74 is associated with a local index 90 and a corresponding local database 92. The news link 76 is associated with a news index 94 and a corresponding news database 96. The pictures link 78 is associated with a picture index 98 and a corresponding picture database 100. The web link 80 is associated with a web index 102 and a corresponding web database 104.

The service metastatement descriptions are typically stored in the service database 84 at the search engine and are indexed in the service index 82, which is searched when a search query for a service is received.

Exemplary search questions include "who sells tickets to knitting factory shows," "who installs satellite antennas in Princeton," "what new cars does a certain dealership sell," "who knows about country populations," "who knows about rankings of baseball players," "who answers direct questions about inventions," and "who sells Pentium laptops for less than $1,000."

An exemplary search query and corresponding answer will now be described. An exemplary search query for a service is: Who sells a Taurus? The corresponding answer, using the first example given above is: Ford card dealership sells a Taurus.

An exemplary search query and corresponding answer will now be described. An exemplary search query for a service is: Who knows about city populations? The corresponding answer, using the second example given above is: ASK.COM knows about city populations.

The system and methods described herein are advantageous because they allow service suppliers to create natural language descriptions of the services that they offer. Since the service providers typically generate the searchable descriptions, they are more accurate. In addition, the format of the description leads to improved capability and accuracy in answering natural language questions. In addition the service suppliers are able to self-advertise their services more efficiently. Since the system uses natural language, only one language is needed to generate the service descriptions and answer the search queries. Thus, no other computing languages are necessary. This simplifies the search process for users because they enter their response in natural language and receive the result in natural language.

The foregoing description with attached drawings is only illustrative of possible embodiments of the described method and should only be construed as such. Other persons of ordinary skill in the art will realize that many other specific embodiments are possible that fall within the scope and spirit of the present idea. The scope of the invention is indicated by the following claims rather than by the foregoing description. Any and all modifications which come within the meaning and range of equivalency of the following claims are to be considered within their scope.

What is claimed is:

1. A method for providing a search result to a user in response to a received search query about a service comprising:

generating, with a search system, natural language service metastatements for a service provider, wherein the metastatements include information regarding search queries answerable by the service provider;

indexing the natural language service metastatements with an indexer;

storing the indexed natural language service metastatements in a database;

receiving, at the search system, the search query about a service from the user via a search engine;

searching, by the search system, the indexed natural language service metastatements in order to identify a natural language service metastatement matching the search query; and providing to the user an answer to the search query using an identified natural language service metastatement via a network.

2. The method of claim 1, wherein the natural language service metastatements are indexed and stored such that a crawler associated with a search engine can locate the natural language service metastatements.

3. The method of claim 1, wherein generating natural language service metastatements for the service provider comprises:

providing at least one target question to the service provider, wherein the target question relates to a search query about a service that is potentially received from a user;

receiving an indication from the service provider that it is enabled to answer the target question;

automatically rephrasing the at least one target question into a statement based on the received indication; and including the statement in at least one of the natural language service metastatements.

4. The method of claim 3, wherein the received indication includes a plurality of questions that are similar to the target question that the service provider is enabled to answer.

5. The method of claim 1, wherein the natural language service metastatement comprises a plurality of statements.

6. The method of claim 5, wherein at least one of the plurality of statements includes an epistemic description of a service provider.

7. The method of claim 1, wherein the answer includes a link to a service provider associated with the identified natural language service metastatement.

* * * * *